United States Patent [19]

Metz et al.

[11] 4,434,005

[45] Feb. 28, 1984

[54] METHOD OF AND APPARATUS FOR REFINING A MELT CONTAINING SOLID COOLING MATERIAL

[75] Inventors: Paul Metz, Luxembourg; François Schleimer, Esch-sur-Alzette; Ferdinand Goedert, Esch-sur-Alzette; Romain Henrion, Esch-sur-Alzette; Henri Klein, Niedercorn; Jean-François Liesch, Luxembourg, all of Luxembourg

[73] Assignee: Arbed S. A. (Luxembourg), Luxembourg, Luxembourg

[21] Appl. No.: 445,037

[22] Filed: Nov. 29, 1982

Related U.S. Application Data

[63] Continuation-in-part of Ser. No. 422,844, Sep. 24, 1982, abandoned.

[51] Int. Cl.³ ............................................. C21C 5/32
[52] U.S. Cl. ...................................... 75/60; 75/52; 75/59; 266/225
[58] Field of Search ................ 75/52, 59, 60; 266/225

[56] References Cited

U.S. PATENT DOCUMENTS

| | | | |
|---|---|---|---|
| 3,854,932 | 12/1974 | Bishop | 75/60 |
| 4,089,677 | 5/1978 | Spenceley | 75/59 |
| 4,302,244 | 11/1981 | Sieckman | 75/59 |
| 4,329,171 | 5/1982 | Edgardo | 75/60 |
| 4,358,314 | 11/1982 | Normanton | 75/59 |

Primary Examiner—Peter D. Rosenberg
Attorney, Agent, or Firm—Karl F. Ross

[57] ABSTRACT

A method of and an apparatus for the refining of a molten metal overlain by a slag and in which cold solids are introduced, e.g. in the form of metal scrap. According to the invention the heat necessary to melt the scrap and prevent undue cooling of the bath is generated by directing a jet of neutral gas entraining carbon against the surface of the melt perpendicularly thereto at Mach 1.5 to Mach 2.5, while refining oxygen is directed at the surface from jets inclined to the carbon entraining jet and the melt is bottomblown by neutral gas to prevent excessive foaming of the slag.

6 Claims, 3 Drawing Figures

1

METHOD OF AND APPARATUS FOR REFINING A MELT CONTAINING SOLID COOLING MATERIAL

CROSS REFERENCE TO RELATED APPLICATIONS

This application is a continuation-in-part application of Ser. No. 422,844 filed Sept. 24, 1982 (now abandoned) which is related to commonly assigned copending applications Ser. No. 261,509 filed May 4, 1981 (now U.S. Pat. No. 4,345,746 of Aug. 24, 1982), Ser. No. 327,450 filed Dec. 4, 1981 (now U.S. Pat. No. 4,392,887 of July 12, 1983), Ser. No. 333,260 filed Dec. 22, 1981, Ser. No. 360,815 filed Mar. 22, 1982, all of which were copending with Ser. No. 204,537 filed Nov. 6, 1980, now U.S. Pat. No. 4,325,730 issued Apr. 20, 1982. The application is also related to Ser. No. 370,501 filed Apr. 21, 1982 and Ser. No. 371,439 filed Apr. 23, 1982, all of said applications naming one or more of the present joint inventors as applicants.

FIELD OF THE INVENTION

Our present invention relates to the refining of a melt of metal in the presence of solid cooling matter and, more particularly, to the refining of ferrous melts in the presence of solid cooling matter such as scrap metal.

BACKGROUND OF THE INVENTION

In the refining of a metal melt, especially a ferrous metal melt such as an iron melt to produce steel, it is common or desirable to introduce substantial amounts of scrap metal, alloying solids and other solid materials, which, relative to the molten metal, constitute cooling agents.

Since a sudden drop in the temperature of the melt is undesirable, uneconomical and may interfere with the progress of the refining process, there have been various proposals for resolving the problem.

The obvious solution is, of course, to limit the amount of the cooling solids which are introduced at any time into the melt. This has the disadvantage of interfering with productivity since effective use of the plant requires that the charging capacity for scrap metal in the melt be increased rather than reduced.

Since scrap metal constitutes most of the solid cooling material which may be introduced into the melt, it has been proposed to preheat the scrap metal using gas or heavy oil burners or even plasma burners. All these operations are expensive, difficult to carry out and require separate pretreatment of the scrap metal and the transfer of hot scrap metal to the melt.

It has also been proposed to incorporate into the metal being refined, energy-generating materials. Thus, for example an excess of carbon may be provided so that, during the refining process the carbon gases can react exothermically with the refining oxygen and thereby generate additional heat which, in turn, can compensate for the cooling action of the large quantities of scrap which can be introduced.

Thus earlier systems have proposed the topblowing or bottomblowing of carbon particles into the melt, e.g. by entrainment with an inert gas.

While, as some of the systems described in the aforementioned copending applications demonstrate, there have been significant improvements in the bottomblowing of a melt with solids entrained in a gas stream, in general, the incorporation of solids into a melt by a gas injected from the bottom can create a problem with respect to clogging of the gas and particle feeders which can only be solved by introducing especially large quantities of gas continuously from the bottom, thereby running the risk of cooling the melt with this gas and reducing the solubilization of carbon because of such local cooling phenomena.

Earlier top blowing systems (see French patent publication No. 79.16626) utilize a carbon carrier, namely calcium carbide entrained in the refining oxygen, the calcium carbide having a particle size of 0.01 to 1 mm.

Apparently, under the circumstances described in this publication, the oxidation of the calcium carbide by the refining oxygen before the penetration of the calcium carbide into the melt does not occur. Apparently this is a consequence of the sudden drop in temperature, counteracting the tendency to such a reaction which occurs as the refining oxygen emerges from the blowing nozzle.

While the use of calcium carbide is successful in enabling the melt to accept large quantities of scrap metal which have not been preheated, this system has the disadvantage that the fabrication of calcium carbide is an energy consuming process such that the calcium carbide is costly.

When attempts are made to carry out the process of this French publication with anthracite powder and other coal dusts or carbonaceous materials, an intensive reaction outside the melt appears to occur which is detrimental to the lining of the vessels, gas ducting equipment and the like. Furthermore the slag above the melt foams excessively and there is a danger that the refining vessel will overflow or that its contents will spatter.

OBJECTS OF THE INVENTION

The principal object of the present invention is to provide an improved method of refining a melt such that comparatively large quantities of scrap metal can be added thereto without excessive cooling of the melt and which utilizes internal heating with low cost comminuted carbon without the dangers and difficulties enumerated above.

Another object of our present invention is to provide an improved method of operating a top and bottom blowing refining vessel, especially for ferrous melts containing large quantities of scrap metal, whereby the drawbacks of earlier systems are obviated.

Yet another object of our invention is to provide an improved apparatus for carrying out the method of the invention.

It is still another object to provide a method of and an apparatus for the refining of a metal melt, particularly an iron melt to steel, containing large quantities of scrap metal and such that excess foaming of the slag does not occur in spite of the use of inexpensive carbonaceous material for the energy source counteracting the cooling effect of the slag.

SUMMARY OF THE INVENTION

These objects and others which will become apparent hereinafter are attained, in accordance with the invention by the operation of a refining vessel which comprises top blowing refining oxygen onto the melt containing the cooling scrap and introducing powdered carbon, an energy generating source to provide the energy required for the heating and melting of the solid scrap suspended in a neutral gas jet from the top while blowing the bath from the bottom with a neutral gas simultaneously.

More specifically, we have discovered that the problems described previously can be eliminated when the powdery carbon is suspended in a neutral gas jet which is directed vertically onto the bath surface at a velocity of Mach 1.5 to 2.5 i.e. a velocity of 1.5 to 2.5 times the speed of sound, the bottom blowing of the melt being effected by introducing a neutral gas simultaneously into the bath through permeable components, (see the aforementioned copending applications) at the bottom of the melting pot.

The term "neutral gas" is here used to refer to a gas which is neither oxidizing nor reducing in nature and hence neither oxidizes the carbon dissolve nor serves as a reducing agent in the melt. Such gases include inert gases such as argon, and gases like nitrogen provided that they do not remain dissolved in the melt to an excessive or detrimental extent.

Surprisingly, the oxygen blowing of the melt from the top can be effected simultaneously with the injection of the pulverulent carbon in the neutral gas and indeed the oxygen jet or jets can be directed onto the melt through a lance head or nozzle head provided with a nozzle orifice through which the carbon entrained in the neutral gas is directed into the melt. The danger of excessive foaming of the slag appears to be completely eliminated by the simultaneous introduction of the same or a different neutral gas from the bottom of the melt in the manner described.

According to the invention, the oxygen blown onto the bath surface consists, on the one hand, of at least one hard jet which is directed onto the bath at an angle of 5° to 20° with respect to the carbon/neutral gas jet and at a substantially equal velocity, i.e. of the order of Mach 1.5 to 2.5, and, on the other hand, of at least one soft jet having a velocity of approximately Mach 0.8 to 1.5 and the axis of which is inclined by 25° to 60° with respect to the axis of the hard oxygen jet. Indeed since this jet is designed to effect the refining operation itself, it is useful that it be directed onto the bath at a rather reduced angle in order to guarantee penetration of the oxygen into the bath, whereas the soft jet is designed to distribute the oxygen over the entire bath surface except for the central zone, in order to effect the post-combustion of the carbon monoxide formed during the refining operation through oxidation of the carbon in the bath and which is evolved at the surface.

Thus, the hard jets of oxygen are arranged on either side of the central, vertical jet, consisting of carbon and neutral gas. A preferred embodiment of the process according to the invention provides for four hard jets which form a curtain around the central carburation jet.

At the outlet of the blowing device, the carbon suspended in the neutral gas jet undergoes a large expansion with the latter, which can be provided by incorporating nozzles into the head of the device which have a converging component followed by a divergent component. Since the velocity of the jet is of the order of Mach 2, the carbon particles are exposed between the outlet of the blowing lance and the bath surface for only approximately 0.02 sec.; the temperature thereof is lowered. Thus, the risk of a premature oxidation of the carbon is practically eliminated, first because of the neutral carrier gas and then, because of the short exposure time and low temperature.

According to the invention, a quantity of neutral gas ranging from 0 to 0.3 $Nm^3$ is injected into the bath per minute and per ton of metal during the refining operation. In this way, foam formation is avoided as a result of the strong evolution of gas upon impact of the carbon with the cinders and with the metal; indeed, foaming slag would oppose, on the one hand, the penetration of carbon into the bath and, on the other hand, the thick layer of foaming slag would prevent the propagation towards the metal of the thermal energy given off by the post-combustion of the carbon monoxide above the bath.

It can indeed be shown that in the absence of an injection of neutral gas through the bottom of the melting pot, the absorption of carbon by the metal is greatly hindered. This results not only in a low yield of solubilized carbon and in a tendency to supply thermal energy to the bath itself, but also in complete combustion of the carbon above the bath which may destroy the blowing installation and even the chimney cooling system.

The grain size distribution of the injected carbon is preferably such that at least 90% of the particles have a diameter of less than 1 mm.

The function of the blowing device used within the scope of a refining process such as described, is complex. Indeed, the oxygen must, on the one hand, penetrate into the bath so that decarburation can occur and must, on the other hand, be distributed onto the bath so that a post-combustion of the carbon monoxide evolved can occur. It is necessary, in addition, to make sure that the post-combustion oxygen be directed onto the surface of the bath in a way such that the post-combustion of the carbon monoxide occurs near the surface and not in the upper regions where the energy evolved would not act to melt the cooling materials added but would jeopardize the lance itself as well as, possibly, the cooling of the melting pot chimney. Furthermore, it is of course necessary that the lance comprises means which ensure that there cannot be at any moment a contact between the carbon and oxygen, either in the lance body or, as far as possible, in the path extending between the lance head and the bath surface.

In order to supply the post-combustion oxygen, it is possible, for example, to provide for the blowing of oxygen subdivided into a multiplicity of jets covering a substantially annular zone which permanently covers the largest possible part of the bath surface. In order to put this technique into practice, it is known to use lances which include several nozzles inclined with respect to the lance axis.

With regard to the oxygen used for refining, it can be provided by nozzles which are inclined by 5°-20° with respect to the lance axis whereas each nozzle designed to provide post-combustion oxygen can have an angle of inclination of 25°-60° with respect to the axis of the neighboring refining oxygen nozzle.

The carbon suspended in neutral gas is projected according to the invention through a nozzle which is located in the axis of the blowing device. Thus, the carbon is directed to the center of the bath surface, in the cold and at a supersonic speed.

If it is desired to use only one blowing device in order to introduce oxygen and carbon into the bath, it is of course necessary to take certain accident preventive measures. Indeed, the carbon blown through the axial nozzle of the lance has a pronounced abrasive power even towards special steels. Thus, there is a risk that the walls of the central nozzle are used up and that there may be a leak; in such a case, an explosion would be probable.

In order to avoid this, the central nozzle is provided, according to the invention, with a metallic sheath filled with a cooling liquid comprising a pressure monitoring system. In case of wear of the wall and of rupture, the device records a pressure loss and transmits appropriate instructions to a safety system, i.e. to a switch which is integrated in the control circuit of the blowing lance and which stops the operations with a view to the replacement of the defective part.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 3:
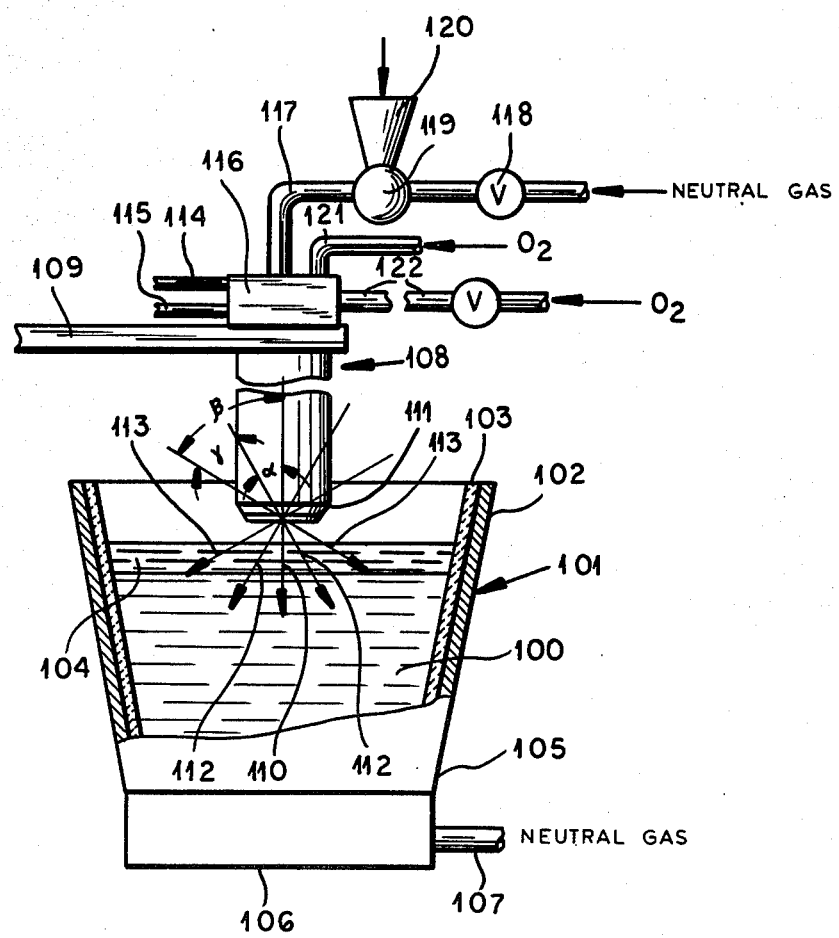
FIG. 3 is a diagram illustrating application of the system of the invention to the refining of an iron melt.

In FIG. 3, which shows an apparatus for the refining of a steel melt 100 in a vessel 101 in highly diagrammatic form, it can be seen that the vessel 101 comprises the usual steel shell 102 and refractory lining 103.

The mouth of this vessel is open toward a gas collecting hood which can communicate with a gas cleaning plant as described in the aforementioned copending applications and in the usual manner.

A layer of slag 104 overlies the melt in which it is assumed, considerable solid material, especially scrap metal which has not been preheated, has been incorporated.

As is also described in the aforementioned copending applications, the bottom 105 of the vessel is formed with porous bodies with which a plenum 106 communicates, this plenum being supplied with a neutral gas by suitable means represented by a pipe 107.

The means 105–107, therefore, allows neutral gas to be introduced through the porous bodies into the bottom of the melt to preclude excessive foaming of the slag 104.

The lance 108, also shown in highly diagrammatic form, is mounted on a support 109 so as to be substantially vertical and is constructed, as will be described in greater detail with respect to FIGS. 1 and 2, to discharge an axial and central jet 110, of a neutral gas at a velocity of 1.5 to 2.5 Mach and in which particles of carbon, e.g. of a particle size 0.1 mm to 0.5 mm, are entrained.

This neutral gas and the entrained carbon particles are injected perpendicularly and centrally from the lance head 111.

In addition to this central jet, a plurality of hard oxygen jets, represented at 112 are directed onto the bath at angles $\alpha$ to the central jet of 5° to 20°, these hard jets having velocities which can be the same or greater than the velocity of the central jet and preferably are of Mach 1.5 to Mach 2.5. Technically pure oxygen can be used for this purpose and is preferred although oxygen enriched air, e.g. air enriched with 40 to 90% oxygen, may be utilized.

As has also been indicated, in addition to the plurality of hard oxygen jets, a number of soft oxygen jets may be provided, these jets being represented at 113 and having a velocity of Mach 0.8 to Mach 1.5. These jets also may consist of technically pure oxygen or oxygen enriched air.

The nozzle orifices having both the hard and soft oxygen jets can be provided in the same head 111 with appropriate orientation of the orifices.

In addition to having an inlet 114 and an outlet 115 for cooling water, the flow distributor 116 of the lance 108 can be provided with a pipe 117 by which the carbon entraining neutral gas can be fed to the central nozzle orifice and passage of the lance.

To this end, the neutral gas, controlled by a valve 118, can pass through a Venturi mixer 119 by which the carbon particles are drawn from a hopper 120 for entrainment into the neutral gas.

Furthermore, the flow distributor 116 can have an inlet symbolized at 121 for the high velocity oxygen feeding the hard oxygen jets and an inlet symbolized at 122 through which the lower velocity oxygen stream is fed, e.g. to the soft oxygen jet.

The jets 113 include angles $\beta$ with the gases of the carbon-entraining jet where $\beta$ can be 30° to 80°. Thus the axes of the soft jets include angles $\gamma$ with the hard oxygen jets ranging from 25° to 60°.

Figure 1:
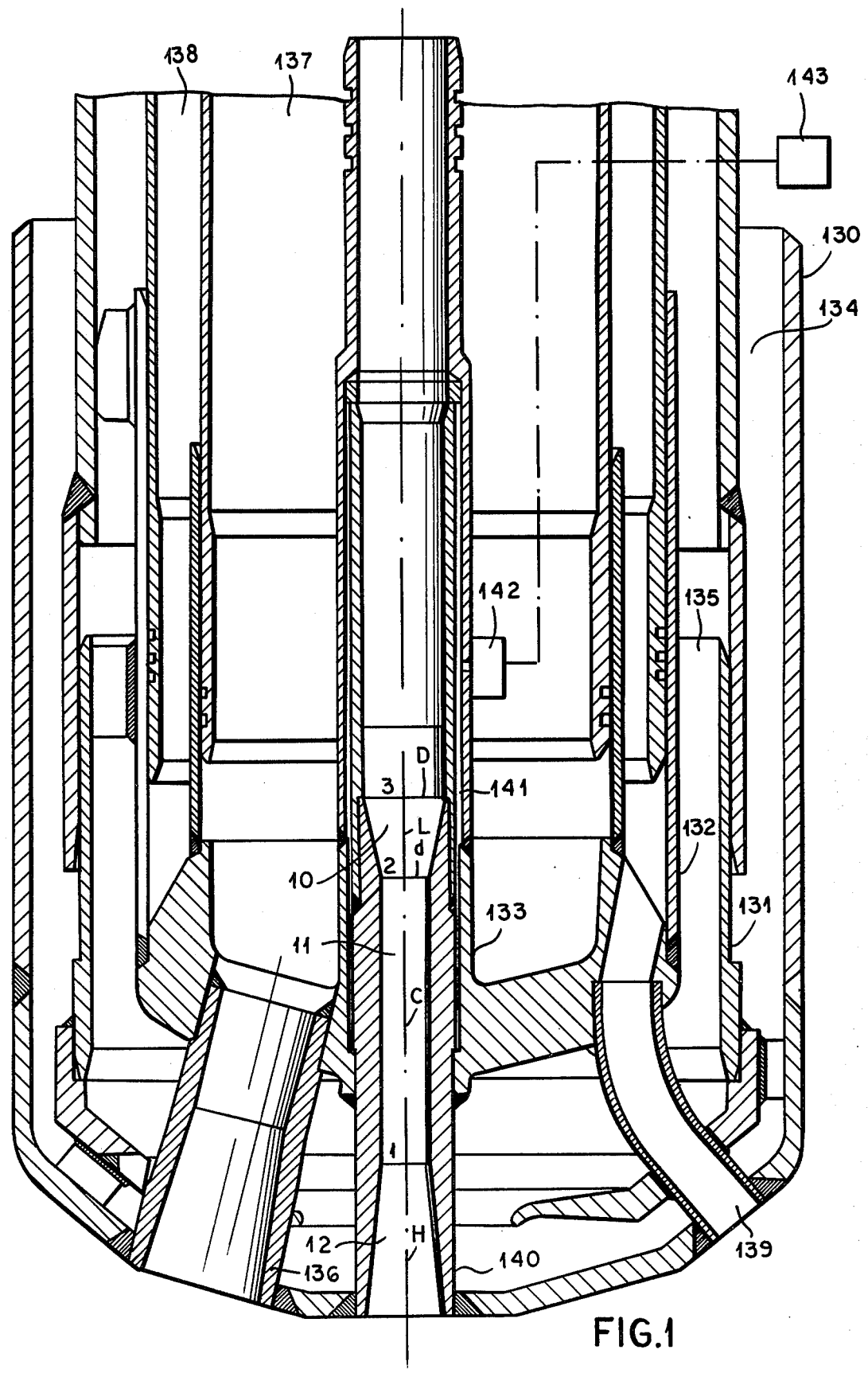
FIG. 1 is an axial section through a head of a blowing lance in accordance with the present invention.
Figure 2:
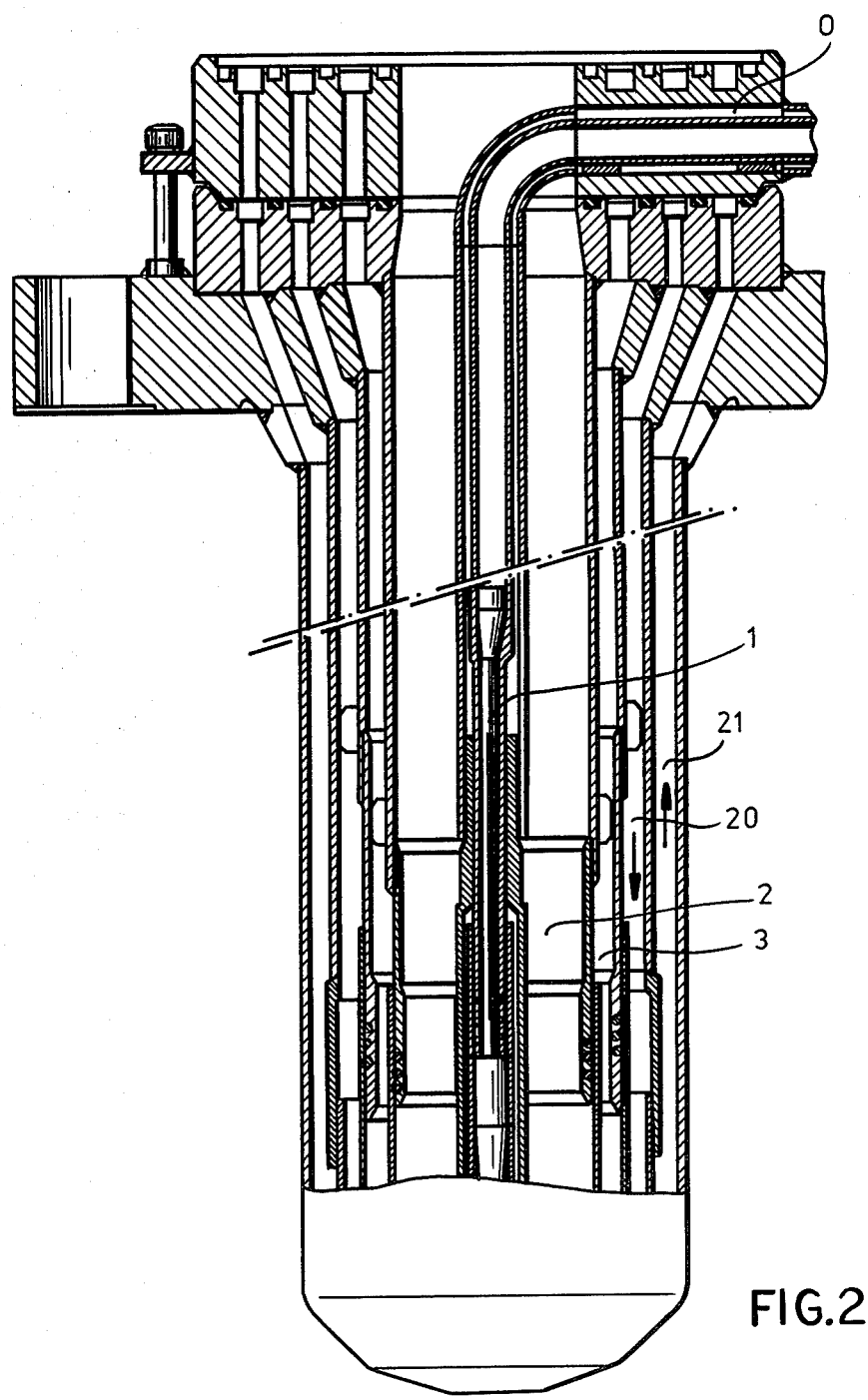
FIG. 2 is a section through the body of the lance.

FIGS. 1 and 2 are sections through the lance head and the body of the lance, respectively, the lance head comprising an outer shell 130 which is joined to an intermediate shell 131 coaxial with a double wall inner member 132 which surrounds a tubular formation 133. Communicating compartments 134 and 135 are coaxial with one another and thus formed for circulation of the cooling water delivered by the pipe 114 and discharged by the pipe 115.

The hard oxygen jets are discharged from nozzle orifices formed by tubes 136 traversing the members 130 and 131 and communicating with a duct 137 to which the high velocity oxygen stream is fed, e.g. via the line 121.

The soft oxygen stream is fed through another duct 138 from the inlet 122 and is discharged from tubular orifices 139.

The tubular central member receives a central nozzle 140 from which the carbon-entraining gas is injected into the melt. The central nozzle 140 has a convergent section 10 followed by a neck 11 and a divergent section 12.

We have found that it is advantageous to provide this nozzle with certain dimensions to guarantee a fine discharge into the melt.

The axial length H between the points 0 and 1 i.e. the length of the divergent component 12, the axial length C between the points 1 and 2 i.e. the length of the neck 1, the axial length L between the points 2 and 3 i.e. axial length of the convergent section 10 and the diameters d and D of this convergent section are important dimensions.

The tubular member 133 constitutes a sheath serving the nozzle 140 and defining the space 141 therewith which is filled with liquid. A pressure switch 142 can respond to the pressure of the liquid in this space in the manner previously described and can operate a control circuit 143 of the device.

The behavior of the carbuation jet, which is essential to the success of the process according to the invention, can be optimized, i.e. the penetration of carbon through the slag into the metal bath can be ensured, by the configuration of the central nozzle. For this purpose, the neck 11 is provided so as to have a length C such that it is at least double its diameter d which is at the same time the outlet diameter of the convergent component 10. This elongated neck with respect to the configurations of the conventional injection nozzles, gives the anticipated advantages, provided the ratio of the length and the neck diameter are respected with regard to the relevant dimensions of the convergent component 11, in accordance with the formula $D/d = 1 + K \cdot L/C$, where dimension K must be greater than 2.

Furthermore, consideration must be given to length H of the divergent component 12 which must be such that dimension K, in same formula in which the total length (C+H) of the neck 11 and the divergent component 12 in accordance with $D/d = 1 + K \cdot L/(C+H)$, are considered, must be greater than 3.5.

The configuration of the jet is therefore not influenced by the span of the outlet section of the divergent component 12, so that slight alterations on the surface of the head of the device according to the invention, will not necessarily affect the configuration of the jet.

FIG. 2 shows the ducts which lead to the nozzles located in the lance head respectively which move the cooling liquid. Duct 1 which leads to the central nozzle, has a sheath O in which is located a liquid under pressure. This liquid is monitored by an appropriate measuring device, not shown, which is connected to a switch integrated in the control circuit of the lance.

The cooling liquid, which is normally water, is moved through ducts 20, 21 in this FIGURE.

SPECIFIC EXAMPLE 111 metric tons of pig iron are refined in a refractory lined vessel. The molten pig iron had a temperature of 1330° C. and a composition by weight of 3.83% carbon, 0.048% sulfur, 0.255% manganese, 1.694% phosphorus, 0.535% silicon and balance iron, as poured from a ladle into the refining vessel which is equipped with a permeable bottom as described in the aforementioned copending applications.

The melt is topblown using a lance head as shown in FIGS. 1 and 2 having four hard oxygen jets and four soft oxygen jets. The angle included between the hard oxygen nozzles and the central nozzle was about 14°. The angle included between each soft oxygen jet and the adjacent hard oxygen jet was approximately 26°.

Prior to the operation according to the invention, 475 kilograms of steel scrap per ton of the melt was introduced at ambient temperature.

The central nozzle was operated with 17 kilograms of carbon powder per ton of the melt, the carbon powder having a particle size between 0.01 and 0.5 mm and being entrained in 30 cubic meters per minute (STP) of argon. The neutral gas jet was utilized for 8 minutes and its velocity was Mach 2.

Simultaneously, the melt was bottomblown with 20 cubic meters per minute (STP) of argon which prevented foaming of the slag.

The hard oxygen jets delivered 2.5 cubic meters of 99% purity oxygen per minute (STP) per ton at about Mach 2 for 19 minutes while simultaneously, the soft oxygen jets delivered 99% purity oxygen at a rate of 1 cubic meter per minute (STP) per ton at a velocity of Mach 1 for 19 minutes.

The resulting steel melt had the following composition:
C = 0.43%
P = 0.018%
Mn = 0.102%
S = 0.026%
balance iron, and a temperature T° = 1630° C.

We claim:

1. A method of refining a metal melt in which solid metal tending to cool the melt has been incorporated, comprising the simultaneous steps of:
    (a) directing at least one refining oxygen jet from above onto a slag-covered surface of said melt whereby oxygen is introduced into said melt exclusively from above;
    (b) directing a jet of neutral gas entraining pulverulent carbon vertically against the surface of said melt in an amount sufficient to provide by exothermic oxidation of the carbon sufficient heat to melt the solid metal and prevent cooling of the melt thereby, said carbon-entraining neutral gas jet being directed into said melt at a velocity of Mach 1.5 to 2.5; and
    (c) injecting neutral gas into said melt through permeable bodies at the bottom thereof in an amount sufficient to prevent foaming of the slag.

2. The method defined in claim 1 wherein at least one hard oxygen jet is directed onto said surface of said melt at an angle of 5° to 20° with respect to the jet of carbon entraining neutral gas at a velocity of substantially Mach 1.5 to 2.5.

3. The method defined in claim 2 wherein a soft oxygen jet is directed onto said melt at a velocity of Mach 0.8 to Mach 1.5 and at an angle of 25° to 60° with respect to the hard oxygen jet.

4. The method defined in claim 2 wherein at least four angularly equispaced hard oxygen jets are directed at said surface of said melt from around said carbon-entraining neutral gas jet and that at least a number of soft oxygen jets are provided which is equal in number to the hard oxygen jets.

5. The method defined in claim 4 wherein said jets are directed against said surface from a common lance head spaced from said surface so that the duration of the carbon free bath from said head to said surface is of the order of 0.02 second.

6. The method defined in claim 5 wherein the pulverulent carbon is a particle size distribution such that at least 90% of the particles have a diameter less than 1 mm.

* * * * *